United States Patent
Wells (10) Patent No.: US 9,177,062 B2
(45) Date of Patent: Nov. 3, 2015

(54) SORTING SOCIAL PROFILE SEARCH RESULTS BASED ON COMPUTING PERSONAL SIMILARITY SCORES

(71) Applicant: Google Inc., Mountain View, CA (US)

(72) Inventor: Benjamin Frederick Wells, Cherrybrook (AU)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 13/664,734

(22) Filed: Oct. 31, 2012

(65) Prior Publication Data

US 2014/0122472 A1    May 1, 2014

(51) Int. Cl.
G06F 17/30    (2006.01)
G06Q 30/02    (2012.01)
G06Q 50/00    (2012.01)

(52) U.S. Cl.
CPC ...... *G06F 17/30864* (2013.01); *G06Q 30/0204* (2013.01); *G06Q 30/0256* (2013.01); *G06Q 50/01* (2013.01)

(58) Field of Classification Search
USPC ........................................................ 707/748
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 8,473,490 B2 * | 6/2013 | Bonilla et al. | 707/732 |
| 2002/0137490 A1 | 9/2002 | Gallant | |
| 2002/0143874 A1 | 10/2002 | Marquette et al. | |
| 2004/0258220 A1 | 12/2004 | Levine et al. | |

(Continued)

FOREIGN PATENT DOCUMENTS

| | | |
|---|---|---|
| KR | 10-1009830 B1 | 1/2011 |
| KR | 10-2012-0058539 A | 6/2012 |
| WO | WO02079984 | 10/2002 |

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Amresh Singh
(74) *Attorney, Agent, or Firm* — Patent Law Works LLP (57) ABSTRACT

The present technology includes systems and methods for searching for social profiles based on user search queries and sorting search results based on determining and matching personal similarities. In some implementations, the systems and methods retrieve a plurality of search results that either partially or fully match a search query by a user of an online community for a particular social profile. The systems and methods determine a plurality of personal similarity factors relating to the search results and compare them to the profile of the user requesting the search based on predetermined criteria and assign varying weights to the personal similarity factors. The weights are aggregated and total scores for the search results are computed. The systems and methods sort the search results based on the total scores to identify and separate results of greater interest to the user from those that of less interest.

21 Claims, 9 Drawing Sheets

(56) References Cited

U.S. PATENT DOCUMENTS

| | | | |
|---|---|---|---|
| 2005/0152521 A1 | 7/2005 | Liljestrand | |
| 2006/0026288 A1 | 2/2006 | Acharya et al. | |
| 2006/0059159 A1 | 3/2006 | Truong et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0245245 A1* | 10/2007 | Blue et al. | 715/739 |
| 2007/0248077 A1 | 10/2007 | Mahle, Jr. et al. | |
| 2008/0056475 A1 | 3/2008 | Brannick et al. | |
| 2008/0080745 A1 | 4/2008 | Vanhoucke et al. | |
| 2008/0192656 A1 | 8/2008 | Vagelos | |
| 2011/0098156 A1 | 4/2011 | Ng et al. | |
| 2011/0131085 A1* | 6/2011 | Wey | 705/14.16 |
| 2012/0197993 A1 | 8/2012 | Skomoroch et al. | |
| 2013/0103758 A1* | 4/2013 | Alison et al. | 709/204 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.
International Search Report and Written Opinion for PCT/US2013/067798, mailed on Feb. 26, 2014, 13 pages.

* cited by examiner

```
┌─────────────────────────────────────┐
│ Assign an "initial" personal        │
│ similarity score of "0" to one or   │
│ more social profiles found          │
│ 502                                 │
└─────────────────────────────────────┘
                  │
                  ▼
┌─────────────────────────────────────┐
│ For each item of similarity that is │
│ determined between the one of more  │
│ social profiles and the user,       │
│ increase the "initial" personal     │
│ similarity score                    │
│ 504                                 │
└─────────────────────────────────────┘
                  │
                  ▼
┌─────────────────────────────────────┐
│ Store a "final" personal similarity │
│ score reflecting an aggregation of  │
│ increases to the "initial" personal │
│ similarity score                    │
│ 506                                 │
└─────────────────────────────────────┘
```

Figure 5

| | Country of residence | Previous country of residence | City of residence | Current employer | Previous school (at matching times) | Previous school (not at matching times) | Similar interests | |
|---|---|---|---|---|---|---|---|---|
| | 1 | 1 | 2 | 5 | 3 | 2 | 2 | |
| Profile of User 1 | | | | | | | | 0 |
| Profile of User 2 | X | | | X | | | | 6 |
| Profile of User 3 | | | | | X | | | 3 |
| Profile of User 4 | X | | X | X | X | | X | 13 |
| ... | | | | | | | | |
| Profile of User N | X | | X | | | X | | 5 |

Weighting Index — Weight items of similarity based on probability of occurrence within the same time frame 1 Country of residence
1 Previous country of residence
2 City of residence
5 Current employer
3 Previous school, at matching times
2 Previous school, not at matching times
...
2 Similar interests

SORTING SOCIAL PROFILE SEARCH RESULTS BASED ON COMPUTING PERSONAL SIMILARITY SCORES

BACKGROUND

The present disclosure relates to technology for sorting and/or ranking search results, in particular, search results relating to a search by a particular user of an online community (for example, a social network) for social profiles of others, where the social profiles found are ranked based on computing personal similarity scores for the social profiles and sorted by ranking them.

Many people in the world share full names (that is, first and last names). As a result searching for individuals by their full names in social media systems typically uncover many similar results, making it difficult to find the particular individual that someone is looking for or wants to find.

SUMMARY

In one innovative aspect, the present disclosure of the technology includes a system comprising a processor and a memory storing instructions that, when executed, cause the system to: receive a search query for a social profile from a user on an online community; retrieve a plurality of social profile results matching the search query; determine a plurality of personal similarity indications between the plurality of social profile results and a profile for the user, based on predetermined criteria for establishing similarity wherein at least one of the predetermined criteria considers a similar time frame during which a personal occurrence is shared; assign a plurality of weights from a range of weights to the plurality of personal similarity indications, based on factors designated by the predetermined criteria; compute a total score for the plurality of social profile results based on an aggregation of the plurality of personal similarity indications and the plurality of weights assigned to the plurality of personal similarity indications; and sort the plurality of social profile results based on the total score.

In general, another innovative aspect of the present disclosure includes a method, using at least one computing device, for receiving a search query for a social profile from a user on an online community; retrieving a plurality of social profile results matching the search query; determining a plurality of personal similarity indications between the plurality of social profile results and a profile for the user, based on predetermined criteria for establishing similarity wherein at least one of the predetermined criteria considers a similar time frame during which a personal occurrence is shared; assigning a plurality of weights from a range of weights to the plurality of personal similarity indications, based on factors designated by the predetermined criteria; computing a total score for the plurality of social profile results based on an aggregation of the plurality of weights assigned to the plurality of personal similarity indications; and sorting the plurality of social profile results based on the total score.

Other implementations of one or more of these aspects include corresponding systems, apparatus, and computer programs, configured to perform the action of the methods, encoded on computer storage devices.

These and other implementations may each optionally include one or more of the following features.

For instance, the operations further include one or more of: providing for display, the plurality of social profile results, to the user making the search query; and assigning an initial score of zero to the plurality of social profile results and subsequently increasing the initial score based on the plurality of weights assigned to the plurality of personal similarity indications to compute the total score.

For instance, the features include: the range of weights includes weight indications of high weights, medium weights, and low weights; the plurality of social profile results are sorted based on significance of the plurality of social profile results to the user indicating an affinity to the user; the significance indicates a descending order of the total score for the plurality of social profile results; and the personality similarity indications include a past occurrence shared by the plurality of social profile results and the profile for the user.

The systems and methods disclosed below are advantageous in a number of respects. With the ongoing trends and growth in social media usage, it would be certainly be beneficial to discover better ways to provide search results relating to social profiles within a social network that satisfy a user's query with greater accuracy. The systems and methods disclosed below are advantageous because rather than only searching for social profiles that exactly match a search query, the systems and methods search for a particular query by a user, but determine if the search results are pertinent to the user by ranking social profiles that are uncovered by a search based on the personal similarities (for example, same employer, same school, same location, etc.) that they share with the user making the query. The search results are then provided for display to the user (who submitted the search query) in an order resulting from personal similarity computations determining a score for each search result based on thereby making it easy for the user (who submitted the search query) to find the social profile of the person he or she is searching for.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

In some implementations, this technology includes systems and methods for searching social profiles based on a search query by a user of an online community, for example, a social network, and ranking and sorting the search results relating to the social profiles that are found. The present technology includes systems and methods for searching for social profiles based on user search queries (for example, for a particular individual) and sorting search results (of possible social profiles found that either partially or completely match the particular individual) based on determining and matching personal similarities between the possible social profiles the profile of the user requesting the search. In some implementations, the systems and methods first retrieve a plurality of search results (social profiles that either partially or entirely match a search query by a user of an online community). In some implementations, search scores for these possible social profiles may be provided by a social engine.

Moreover, the present technology determines a plurality of personal similarity factors or indications relating to the search results (the possible social profiles found) and compares them to the profile of the user requesting the search based on predetermined criteria. Varying weights (based on considering the probability or likelihood of a shared occurrence in a certain time frame) are assigned to the personal similarity factors or indication, which are aggregated to reflect a final score. In some implementations, an "initial" personal similarity score for a possible social profile found may start with "0." For each item of similarity with the user that is determined, the "initial" personal similarity score is increased by a predetermined amount, until a "final" personal similarity score reflecting an aggregation of increases to the "initial" score is computed. Total scores for the search results are computed by adding "final" personal similarity scores to the search scores. The systems and methods use the total scores to rank the search results and sort them to identify and separate results of greater interest to the user making the search query from those that are of less interest.

In some implementations, the social profiles are ranked based on using algorithms to determine the personal similarity factors or indications based on predetermined criteria and computing personal similarity scores. The predetermined criteria may include personal characteristics, demographics, circumstances, etc. The personal similarities of the search results may be compared with personal characteristics of the user requesting the search.

In some implementations, the systems and methods receive a search query from a user, retrieve one or more possible social profile search results, compare the one or more possible social profile search results to the user's profile (who submitted the search query), calculate a personal similarity score based on the similarities between the user's profile and the one or more social profile search results, and sort the one or more social profile search results based on the personal similarity score.

Typically when searching for individuals (for example, to add them to a group of friends), the person searching has encountered that person in the past or the person searching has something in common with them. To make social profiles that match these criteria more visible in search results, the results may be ranked according to a personal similarity score. As one example, for a particular user, items of similarity determined by a social network may increase the personal similarity score, as a result of which the ranking of a social profile uncovered increases among the search results found and provided for display.

Figure 1:
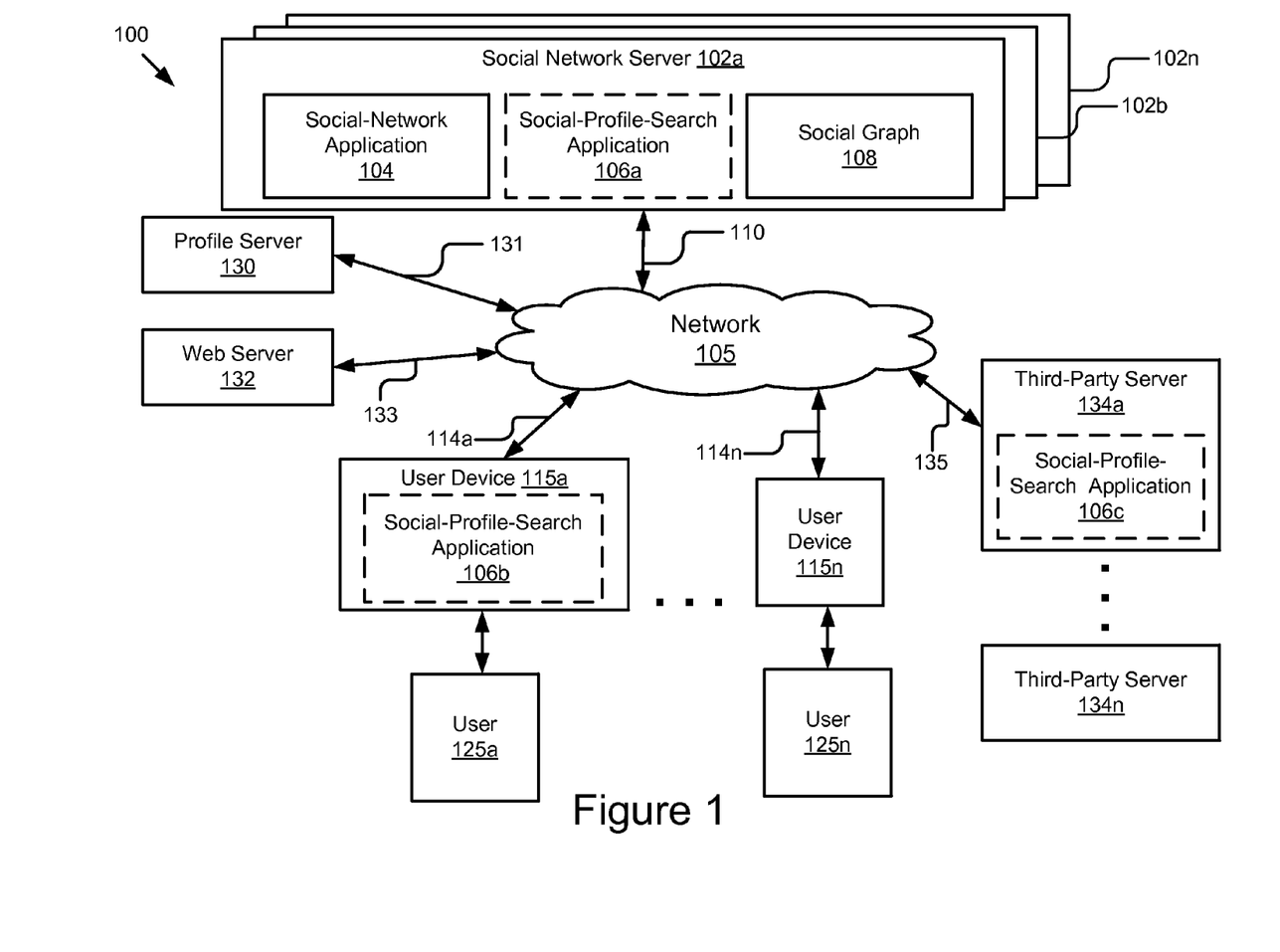
FIG. 1 is a block diagram illustrating an example system including a social-profile-search application for determining personal similarity indications of search results (including social profiles found) to a user's query (for a particular person) based on comparing social profile information of the search results to the user's profile.

FIG. 1 is a high-level block diagram illustrating some implementations of systems for ranking and/or sorting social profile results based on a personal similarity score that is computed for one or more of the social profile results. The system 100 illustrated in FIG. 1 provides system architecture (distributed or other) for ranking and/or sorting social profile results based on a personal similarity score. The system 100 includes one or more social network servers 102a, 102b, through 102n, that may be accessed via user devices 115a through 115n, which are used by users 125a through 125n, to connect to one of the social network servers 102a, 102b, through 102n. These entities are communicatively coupled via a network 105. Although only two user devices 115a through 115n are illustrated, one or more user devices 115n may be used by one or more users 125n.

Moreover, while the present disclosure is described below primarily in the context of providing a framework for ranking and sorting social profile results based on a personal similarity score, the present disclosure may be applicable to other situations where ranking search results for a purpose that may not be related to social profiles, may be desired. For ease of understanding and brevity, the present disclosure is described in reference to ranking and sorting social profile results based on a personal similarity score.

The user devices 115a through 115n in FIG. 1 are illustrated simply as one example. Although FIG. 1 illustrates only two devices, the present disclosure applies to a system architecture having one or more user devices 115, therefore, one or more user devices 115n may be used. Furthermore, while only one network 105 is illustrated as coupled to the user devices 115a through 115n, the social network servers, 102a-102n, the profile server 130, the web server 132, and third-party servers 134a through 134n, in practice, one or more networks 105 may be connected to these entities. In addition, although only two third-party servers 134a through 134n are shown, the system 100 may include one or more third-party servers 134n.

In some implementations, the social network server 102a may be coupled to the network 105 via a signal line 110. The social network server 102a includes a social-network application 104, which includes the software routines and instructions to operate the social network server 102a and its functions and operations. Although only one social network server 102a is described here, multiple servers may be present, as illustrated by social network servers 102b through 102n, each with functionality similar to social network server 102a or different.

The term "social network" as used here includes, but is not limited to, a type of social structure where the users are connected by a common feature or link. The common feature includes relationships/connections, e.g., friendship, family, work, a similar interest, etc. The common features are provided by one or more social networking systems, for example those included in the system 100, including explicitly-defined relationships and relationships implied by social connections with other online users, where the relationships form the social graph 108.

The term "social graph" as used here includes, but is not limited to, a set of online relationships between users, for example provided by one or more social networking systems, for example the social network system 100, including explicitly-defined relationships and relationships implied by social connections with other online users, where the relationships form a social graph 108. In some examples, the social graph 108 may reflect a mapping of these users and how they are related to one another.

The social network server 102a and the social network software/application 104 as illustrated are representative of a single social network. Each of the plurality of social network servers 102a, 102b through 102n, may be coupled to the network 105, each having its own server, application, and social graph. For example, a first social network hosted on a social network server 102a may be directed to business networking, a second on a social network server 102b directed to or centered on academics, a third on a social network server 102c (not separately shown) directed to local business, a fourth on a social network server 102d (not separately shown) directed to dating, and yet others on social network server (102n) directed to other general interests or perhaps a specific focus.

A profile server 130 is illustrated as a stand-alone server in FIG. 1. In other implementations of the system 100, all or part of the profile server 130 may be part of the social network server 102a. The profile server 130 may be connected to the network 105 via a line 131. The profile server 130 has profiles for the users that belong to a particular social network 102a-102n. One or more third-party servers 134a through 134n are connected to the network 105, via signal line 135. A web server 132 may be connected, via line 133, to the network 105.

The social network server 102a includes a social-profile search application 106a, to which user devices 115a through 115n are coupled via the network 105. In particular, user devices 115a through 115n may be coupled, via signal lines 114a through 114n, to the network 105. The user 125a interacts via the user device 115a to access the social-profile search application 106 to search for one or more social profiles within a social network. The social-profile search application 106 or certain components of it may be stored in a distributed architecture in one or more of the social network server 102, the third-party server 134, and the user device 115. In some implementations, the social-profile search application 106 may be included, either partially or entirely, in one or more of the social network server 102, the third-party server 134, and the user device 115.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or an electronic device capable of accessing a network.

The network 105 may be of conventional type, wired or wireless, and may have a number of configurations for example a star configuration, token ring configuration, or other configurations. Furthermore, the network 105 may comprise a local area network (LAN), a wide area network (WAN, e.g., the Internet), and/or another interconnected data path across which one or more devices may communicate.

In some implementations, the network 105 may be a peer-to-peer network. The network 105 may also be coupled to or include portions of one or more telecommunications networks for sending data in a variety of different communication protocols.

In some instances, the network 105 includes Bluetooth communication networks or a cellular communications network for sending and receiving data for example via short messaging service (SMS), multimedia messaging service (MMS), hypertext transfer protocol (HTTP), direct data connection, WAP, email, etc.

In some implementations, the social network servers, 102a-102n, the profile server 130, the web server 132, and the third-party servers 134a through 134n are hardware servers including a processor, memory, and network communication capabilities. One or more of the users 125a through 125n access one or more of the social network servers 102a through 102n, via browsers in their user devices and via the web server 132.

As one example, in some implementations of the system, the interest profiles of particular users (125a through 125n) of a social network 102a through 102n may be retrieved from the social graph 108. It should be noted that information that may be retrieved for particular users is only upon obtaining the necessary permissions from the users, in order to protect user privacy and sensitive information of the users.

Figure 2:
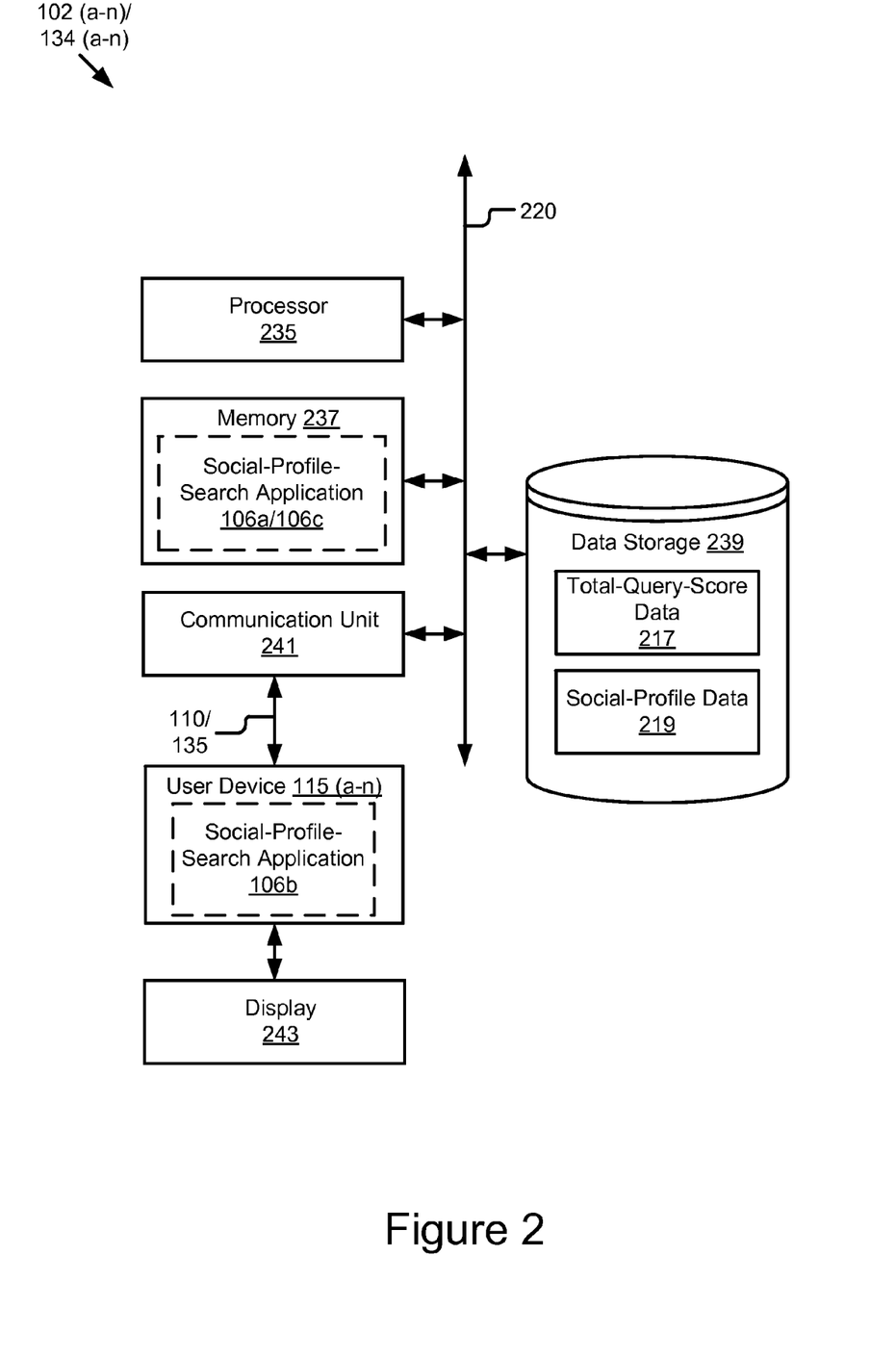
FIG. 2 is a block diagram illustrating example hardware components in some implementations of the system shown in FIG. 1.

FIG. 2 is a block diagram illustrating some implementations of a social network server 102a through 102n and a third-party server 134a through 134n, the system including the social-profile-search application 106a/106b. In FIG. 2, like reference numerals have been used to reference like components with the same or similar functionality that has been described above with reference to FIG. 1. Since those components have been described above that description is not repeated here. The system generally includes one or more processors, although only one processor 235 is illustrated in FIG. 2. The processor may be coupled, via a bus 220, to memory 237 and data storage 239, which stores total-query-score data 217 and social-profile data 219, received from the other sources identified above. In some instances, the data storage 239 may be a database organized by a social network. In some instances, the social-profile-search application 106a/106b may be stored in the memory 237.

A user 125a, via a user device 115a, may search for one or more social profiles, via communication unit 241. In some implementations, the user device may be communicatively coupled to a display 243 to display information to the user. The social-profile-search application 106a and 106c may reside, in their entirety or parts of them, in the user's device (115a through 115n), in the social network server 102a (through 102n), or, in a separate server, for example, in the third-party server 134 (FIG. 1). The user device 115a communicates with the social network server 102a using the communication unit 241, via signal line 110.

Figure 3:
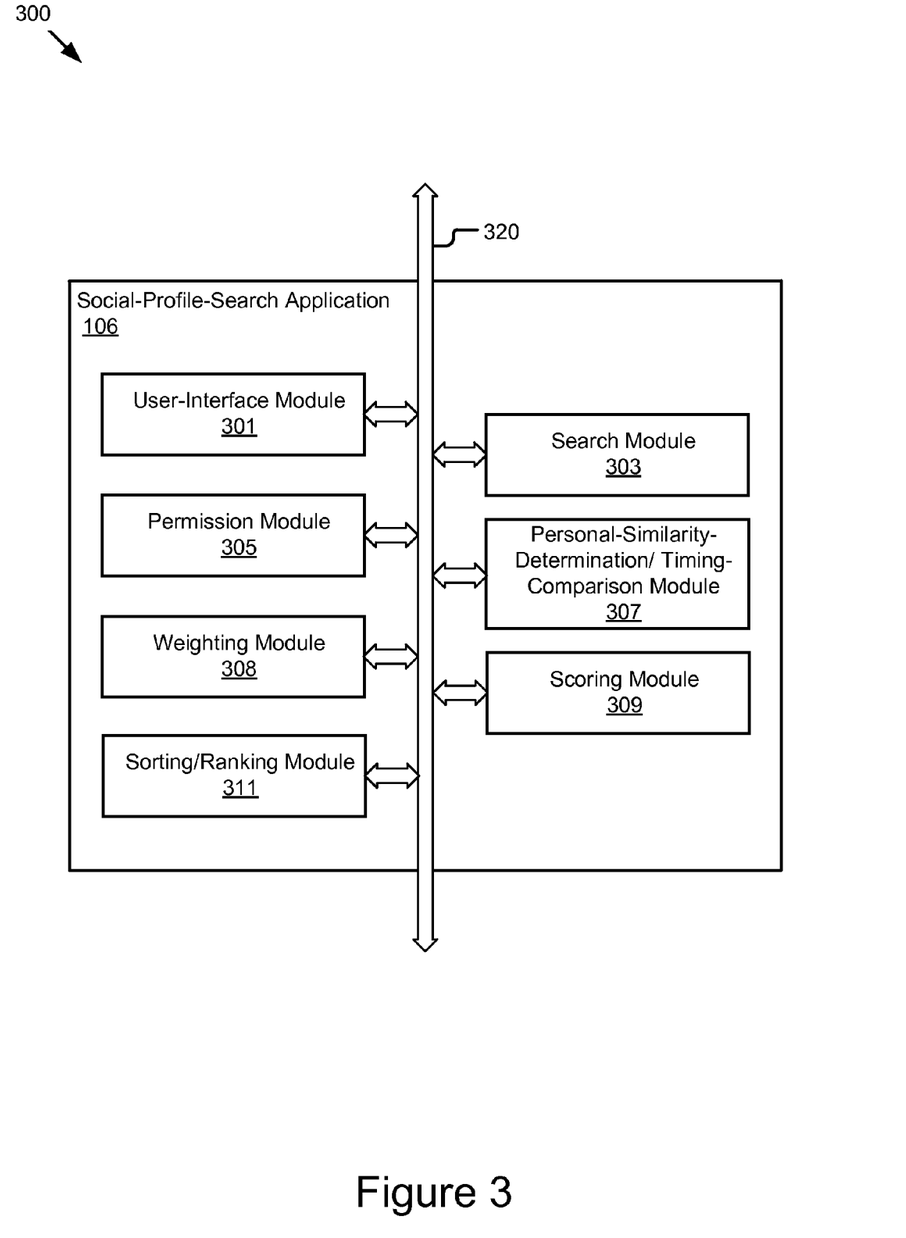
FIG. 3 is a block diagram illustrating an example social-profile-search application and its software components.

Referring now to FIG. 3, like reference numerals have been used to reference like components with the same or similar functionality that has been described above with reference to FIGS. 1 and 2. Since those components have been described above that description is not repeated here. An implementation of the social-profile-search application 106a/106b, indicated in FIG. 3 by reference numeral 300, includes various applications or engines that are programmed to perform the functionalities described here. A user-interface module 301 is configured for generating a user interface for displaying social profile search results. A searching module 303 is configured for searching for one or more social profiles within a social network and finding possible matches that either partially or entirely match the search query. A permission module 305 is configured for determining user permissions for viewing content to maintain user privacy. A personal-similarity-determination/timing-comparison module 307 is configured for comparing personal similarity factors or indications of the one or more social profiles based on comparing profile information. A weighting module 308 is configured for associating one or more weights associated with the one or more items of similarity based on the probability or likelihood of an occurrence of a particular item of similarity within a certain time frame that is shared, for example, by the possible social profile and the user requesting the search. A scoring module 309 is configured for scoring the one or more possible social profiles based on the items of similarity determined for each possible social profile. A sorting/ranking module 311 is configured for sorting the one or more possible social profile search results based on the personal similarity scores that are computed for the possible social search results.

The social-profile-search application 106*a* and 106*c* includes applications or engines that communicate over the software communication mechanism 320. Software communication mechanism 320 may be an object bus (for example CORBA), direct socket communication (for example TCP/IP sockets) among software modules, remote procedure calls, UDP broadcasts and receipts, HTTP connections, function or procedure calls, etc. Further, the communication could be secure (SSH, HTTPS, etc.). The software communication may be implemented on underlying hardware, for example a network, the Internet, a bus 220 (FIG. 2), a combination thereof, etc.

The user-interface module 301 may be software including routines for generating a user interface. In some implementations, the user-interface module 301 can be a set of instructions executable by the processor 235 to provide the functionality described below for generating a user interface for displaying social profile search results. In other implementations, the user-interface module 301 can be stored in the memory 237 of the social network server 102 and/or the third-party server 134 and can be accessible and executable by the processor 235. In either implementation, the user-interface module 301 can be adapted for cooperation and communication with the processor 235, the communication unit 241, data storage 239 and other components of the social network server 102 and/or the third-party server 134 via the bus 220.

In some implementations, the user-interface module 301 may receive a search query from a user for a particular individual or person and may generate a user interface for providing a display of search results (social profiles) found that either partially or entirely match the search query. In some implementations, the user-interface module 301 may generate a user interface for displaying other information relating to the social network including social profile information.

The searching module 303 may be software including routines for searching for social profiles. In some implementations, the searching module 303 can be a set of instructions executable by the processor 235 to provide the functionality described below for searching for one or more social profiles within a social network. In other implementations, the searching module 303 can be stored in the memory 237 of the social network server 102 and/or the third-party server 134 and can be accessible and executable by the processor 235. In either implementation, the searching module 303 can be adapted for cooperation and communication with the processor 235, the communication unit 241, data storage 239 and other components of the social network server 102 and/or the third-party server 134 via the bus 220.

In some implementations, the searching module 303 receives a search query via the user-interface module 301 and searches for and retrieves one or more social profiles from the social network (i.e., social graph 108) that either completely or partially match the search query. The searching module 303 then returns the complete and/or partial matches to the search query.

The permission module 305 may be software including routines for determining user permissions. In some implementations, the permission module 305 can be a set of instructions executable by the processor 235 to provide the functionality described below for determining user permissions for viewing content to maintain user privacy. In other implementations, the permission module 305 can be stored in the memory 237 of the social network server 102 and/or the third-party server 134 and can be accessible and executable by the processor 235. In either implementation, the permission module 305 can be adapted for cooperation and communication with the processor 235, the communication unit 241, data storage 239 and other components of the social network server 102 and/or the third-party server 134 via the bus 220.

In some implementations, the permission module 305 determines permissions based on whether users have permission to view other user's social profile information. For example, if a user has a private social profile, only users that are friends with the user may view their social profile information. This helps maintain user privacy within the social network.

The personal-similarity-determination/timing-comparison module 307 may be software including routines for comparing social profiles. In some implementations, the personal-similarity-determination/timing-comparison module 307 can be a set of instructions executable by the processor 235 to provide the functionality described below for comparing personal similarity factors or indications of the one or more possible social profiles that are found with the profile information of the user requesting the search for a particular individual. This module 307 determines if personal similarity occurrences are shared within a certain time frame. The probability or likelihood of a shared occurrence within a certain time frame increases the likelihood that a possible social profile is the one that the particular user requesting the search is searching for. In other implementations, the personal-similarity-determination/timing-comparison module 307 can be stored in the memory 237 of the social network server 102 and/or the third-party server 134 and can be accessible and executable by the processor 235. In either implementation, the personal-similarity-determination/timing-comparison module 307 can be adapted for cooperation and communication with the processor 235, the communication unit 241, data storage 239 and other components of the social network server 102 and/or the third-party server 134 via the bus 220.

In some implementations, the personal-similarity-determination/timing comparison-module 307 compares the one or more social profiles to the user profile (that submitted the search query) to determine personal similarity. For example, the personal-similarity-determination/timing-comparison module 307 compares profile information to determine if there are similarities (e.g., went to the same school, are from the same town, etc.).

In some implementations, the personal-similarity-determination/timing-comparison module 307 compares personal similarity based on timing, that is to determine if an occurrence is shared within a certain time frame. For example, the personal-similarity-determination/timing-comparison module 307 determines that two people attended the same school during the same period of time or they worked at the same place during the same period of time and therefore share similar profile information.

The weighting module 308 may be software including routines for associating weights with items of similarity. In some implementations, the weighting module 308 can be a set of instructions executable by the processor 235 to provide the functionality described below for retrieving and associating one or more weights associated with the one or more items of similarity. In other implementations, the weighting module 308 can be stored in the memory 237 of the social network server 102 and/or the third-party server 134 and can be accessible and executable by the processor 235. In either implementation, the weighting module 308 can be adapted for cooperation and communication with the processor 235, the communication unit 241, data storage 239 and other components of the social network server 102 and/or the third-party server 134 via the bus 220.

In some implementations, the weighting module 308 retrieves one or more predetermined weights corresponding to the one or more items of similarity. In some instances, the magnitude of the weight is based on the probability or likelihood of occurrence within the same time frame for the particular item of similarity.

For example, some items of similarity and varying weights accorded to them are indicated below:
  Country of residence—Low weight
  Previous country of residence—Low weight
  City of residence—Medium weight
  Current employer—Very high weight
  Previous school or employer at matching times—High weight
  Previous school or employer, not at matching times—Medium weight
  Similar interests—Medium weight The scoring module 309 may be software including routines for scoring social profiles. In some implementations, the scoring module 309 can be a set of instructions executable by the processor 235 to provide the functionality described below for scoring the one or more social profiles based on the similarity of the social profile information. In other implementations, the scoring module 309 can be stored in the memory 237 of the social network server 102 and/or the third-party server 134 and can be accessible and executable by the processor 235. In either implementation, the scoring module 309 can be adapted for cooperation and communication with the processor 235, the communication unit 241, data storage 239 and other components of the social network server 102 and/or the third-party server 134 via the bus 220.

In some implementations, the scoring module 309 calculates a personal similarity score based on the similar content determined by the personal-similarity-determination/timing-comparison module 307 (i.e., between the user profile and the one or more social profiles). The scoring module 309 increases the personal similarity score based on items of similarity that are determined and their corresponding weights received from the weighting module 308.

In some implementations, a user's total query score may be equal to a search score plus the personal similarity score. A search score may be calculated based on the search query and the one or more social profiles.

For example, the scoring module 309, receives the complete and partial matches to the search query from the searching module 303 and, for each match, calculates a search score. The scoring module 309 then calculates, for each match, a personal similarity score. The scoring module 309 calculates the personal similarity score by assigning an initial score to zero and, for each item of similarity, add its weight to the current score.

Various techniques and algorithms for determining weights for similarities, and computing the search scores and the personal similarity scores may be used. The weighting schemes that are described here are illustrative and may be adjusted to accord more or less weight to various factors.

In some implementations, the scoring module 309 calculates the distance (i.e., degrees of separation) between users to rank the search results. For example, a friend of a friend would be given a higher weight than a user with no similar contacts.

In some instances, the scoring module 309 may calculate and use the search score. In some instances the scoring module 309 may calculate and use the personal similarity score.

The sorting/ranking module 311 may be software including routines for sorting social profiles. In some implementations, the sorting/ranking module 311 can be a set of instructions executable by the processor 235 to provide the functionality described below for sorting one or more social profile search results based on the one or more personal similarity scores. In other implementations, the sorting/ranking module 311 can be stored in the memory 237 of the social network server 102 and/or the third-party server 134 and can be accessible and executable by the processor 235. In either implementation, the sorting/ranking module 311 can be adapted for cooperation and communication with the processor 235, the communication unit 241, data storage 239 and other components of the social network server 102 and/or the third-party server 134 via the bus 220.

In some implementations, the sorting/ranking module 311 sorts (ranks and sorts) the social profile search results matching the search query based on the score from the scoring module 309. For example, a high personal similarity score increases a social profile's position in the search results.

In some implementations, the sorting/ranking module 311 sorts search results in descending order of the total score. For example, the position of each returned result may be influenced by the personal similarity score, in addition to the search score which depends on how closely the user's profile details match those searched for.

Figure 4:
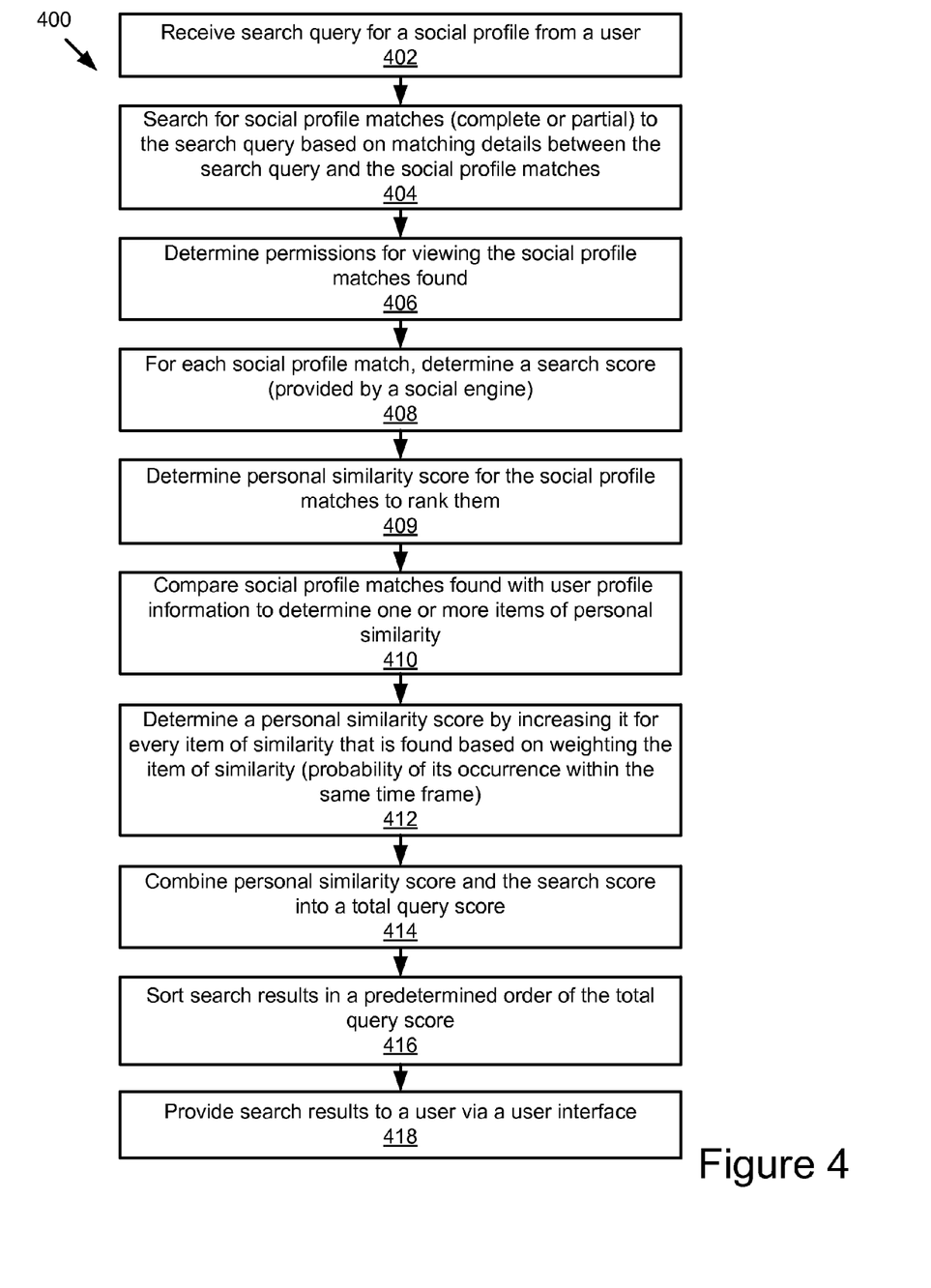
FIG. 4 is a flowchart illustrating an example method for ranking and sorting social profile search results.

FIG. 4 is a flow chart illustrating an example method indicated by reference numeral 400 for providing social profile search results in order based on personal similarity. It should be understood that the order of the operations in FIG. 4 is merely by way of example and may be performed in different orders than those that are illustrated and some operations may be excluded, and different combinations of the operations may be performed. In the example method illustrated, one or more operations may include receiving a search query for a social profile from a user, as illustrated by block 402. The method 400 then proceeds to the next block 404 and may include one or more operations to search for social profile matches (complete or partial) to the search query based on matching details between the search query and the social profile matches. The method 400 then proceeds to the next block 406 and may include one or more operations to determine permissions for viewing the social profile matches found. The method 400 then proceeds to the next block 408 and may include one or more operations to determine a search score (provided by a social engine) for each social profile match. The method 400 then proceeds to the next block 409 and may include one or more operations to determine a personal similarity score for the social profile matches to rank them. The method 400 then proceeds to the next block 410 and may include one or more operations to compare profile matches found with user profile information to determine one or more items of personal similarity. The method 400 then proceeds to the next block 412 and may include one or more operations to determine a personal similarity score by increasing it for every item of similarity that is found based on weighting the item of similarity (probability of its occurrence within the same time frame). The method 400 then proceeds to the next block 414 and may include one or more operations to combine the personal similarity score and the search score into a total query score. The method 400 then proceeds to the next block 416 and may include one or more operations to sort search results in a predetermined order (e.g., descending order) of the total query score. The method 400 then proceeds to the next block 418 and may include one or more operations to provide search results to a user via a user interface.

Figure 5:
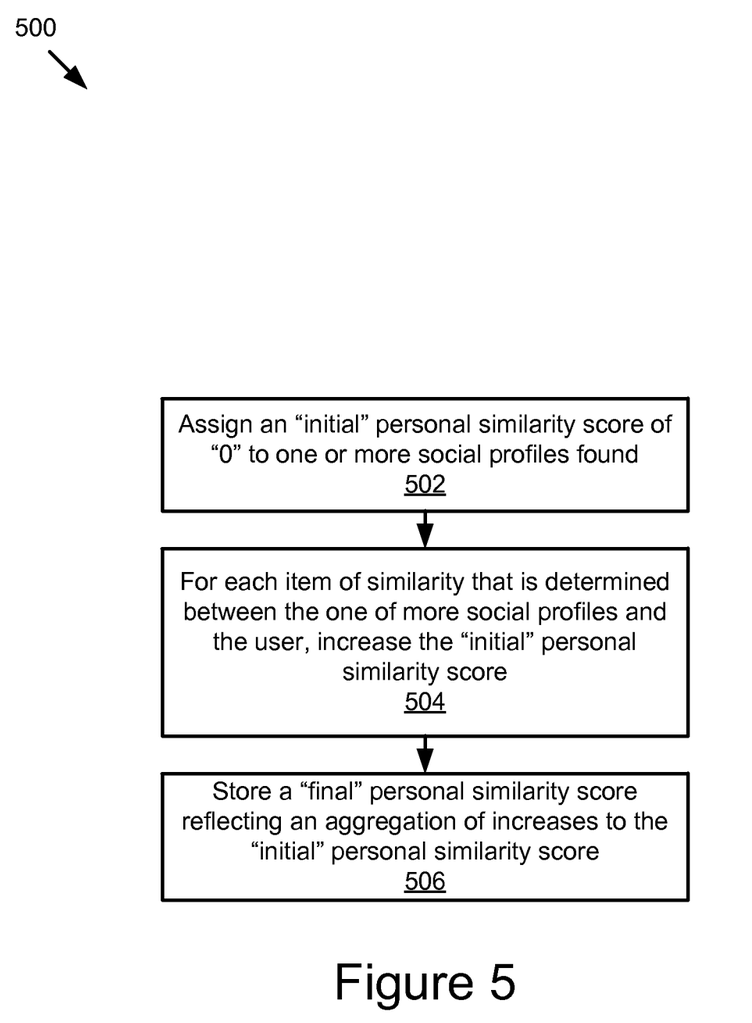
FIG. 5 is a flowchart illustrating an example method for computing personal similarity scores for social profile search results by increasing from an initial amount to a final based on determining personal similarity indications.

FIG. 5 is a flow chart illustrating an example method indicated by reference numeral 500 for calculating a personal similarity score. It should be understood that the order of the operations in FIG. 5 is merely by way of example and may be performed in different orders than those that are illustrated and some operations may be excluded, and different combinations of the operations may be performed. In the example method illustrated, one or more operations may include assigning an "initial" personal similarity score of "0" to one or more social profiles found, as illustrated by block 502. The method 500 then proceeds to the next block 504 and may include one or more operations to, for each item of similarity that is determined between the one or more social profiles and the user, increase the "initial" personal similarity score. The method 500 then proceeds to the next block 506 and may include one or more operations to store a "final" personal similarity score reflecting an aggregation of increases to the "initial" personal similarity score.

Figure 6:
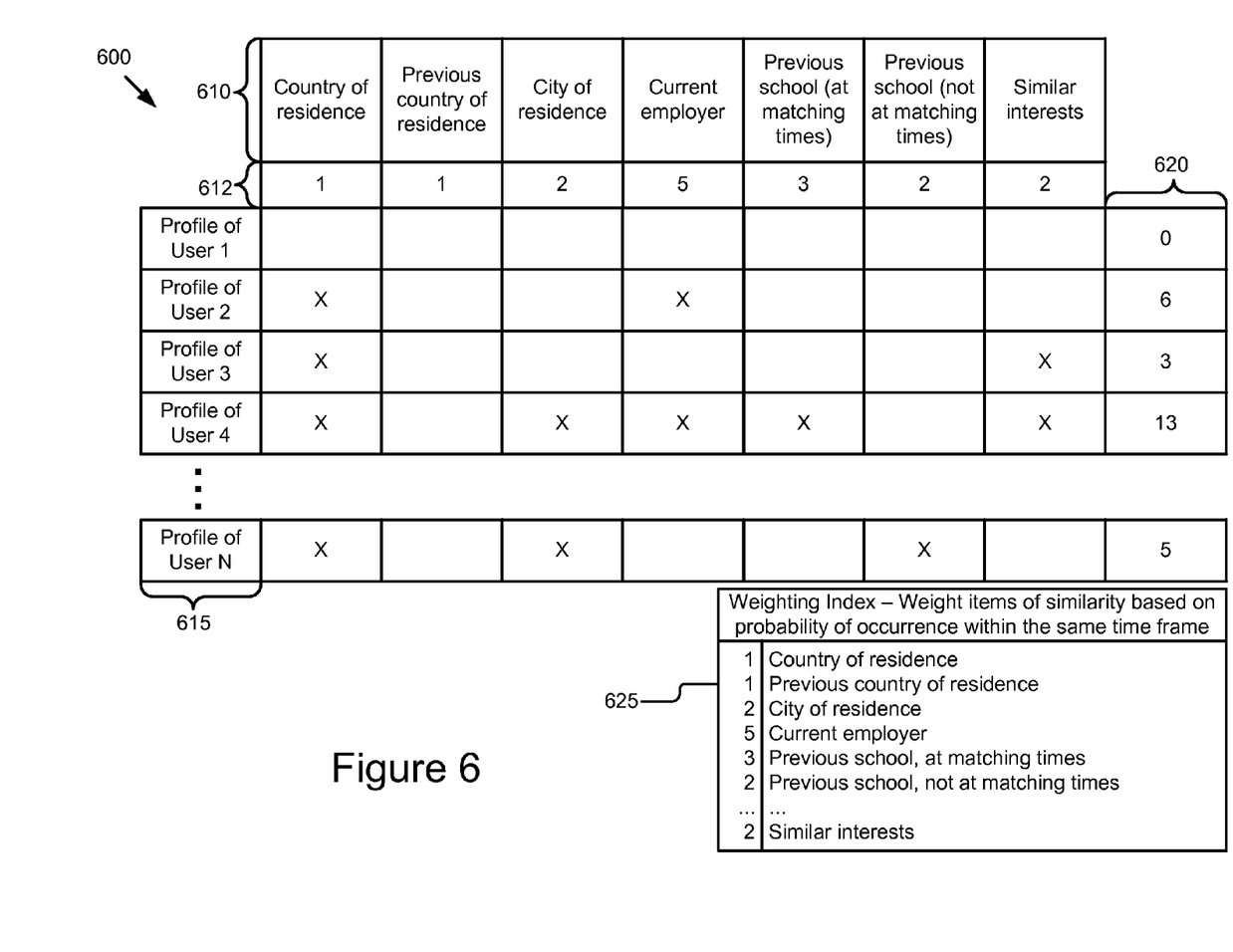
FIG. 6 is a graphic representation of an example scheme for personal similarity scoring with an illustration of a weighting index.

FIG. 6 is a graphic representation 600 of an example of personal similarity scoring results including a weighting index. The graphic representation 600 illustrates items of similarities 610 country of residence, previous country of residence, city of residence, current employer, previous school (at matching times), previous school (not at matching times), and similar interests. Each of these items of similarity 610 includes a corresponding weight 612. The weights are 1 (low weight) for country of residence, 1 (low weight) for previous country of residence, 2 (medium weight) for city of residence, 5 (very high weight) for current employer, 3 (high weight) for previous school (at matching times), 2 (medium weight) for previous school (not at matching times), and 2 (medium weight) for similar interests. The graphic representation 600 also illustrates user profile search results 615, a personal similarity scores, and a weighting index 625 for items of similarity (e.g., weighting items of similarity may be based on probability of occurrence within the same time frame).

The graphic representation 600 illustrates the profile of each user 1 through N and their corresponding scores according to each personal similarity item. For example, the profile of user 1 does not have personal similarity items matching the user performing the search and therefore has a personal similarity score of 0. The profile of user 2 has the same country of residence and the same employer and thus has a personal similarity score of 6. The profile of user 3 has the same country of residence and similar interests and thus has a personal similarity score of 3. The profile of user 4 has the same country of residence, the same city of residence, the same employer, the same previous school (at matching times), and similar interests and thus has a personal similarity score of 13. The profile of user N has the same country of residence, the same city of residence, and the same previous school (not at matching times) and thus has a personal similarity score of 5. The numbers used here are used by way of example and may differ depending on implementation.

Figure 7:
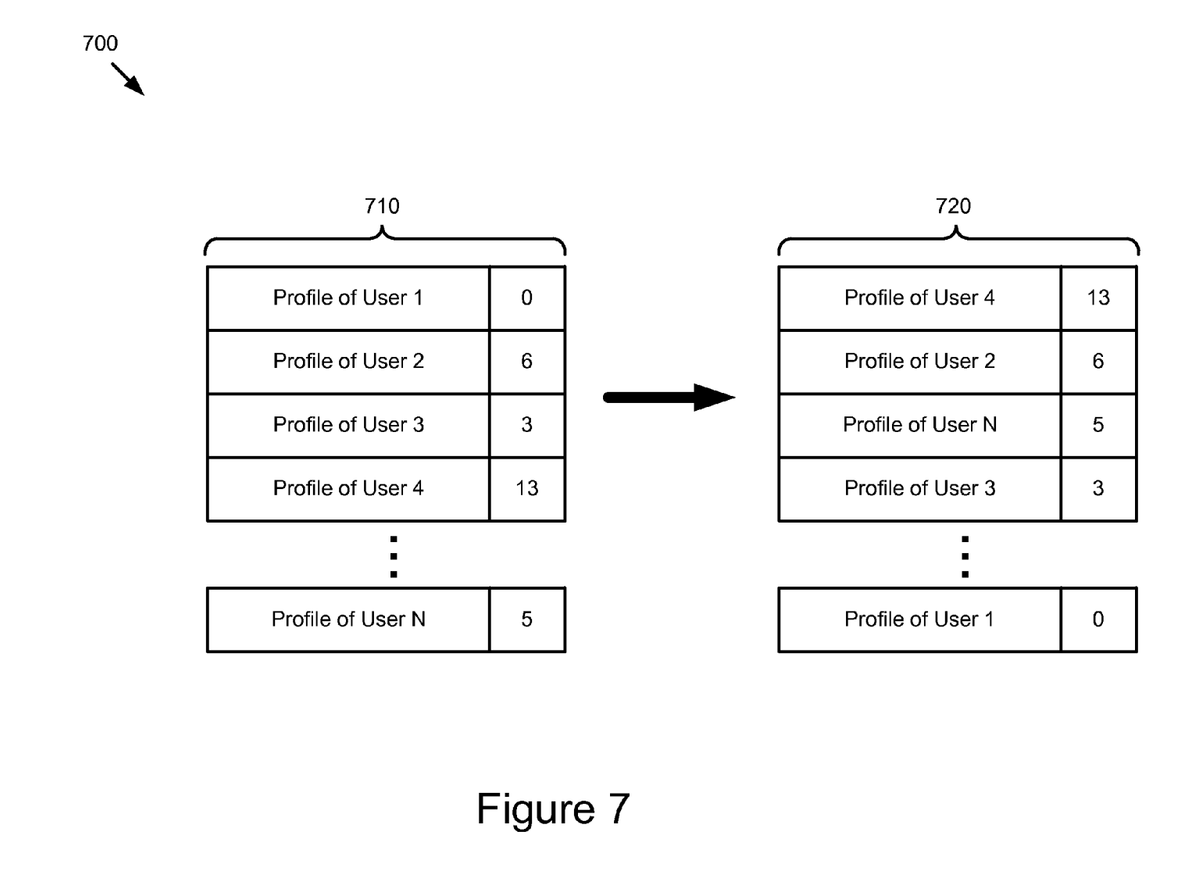
FIG. 7 is a graphic representation of an example scheme for sorting social profile search results.

FIG. 7 is a graphic representation 700 of an example for sorting social profile search results. In this example, the list 710 of received search results is illustrated. The sorting/ranking module 311 sorts the list 710 of received search results based on the scores illustrated in FIG. 6 to obtain a sorted list 720. In this example, the sorted list 720 is sorted in a descending order.

Figure 8:
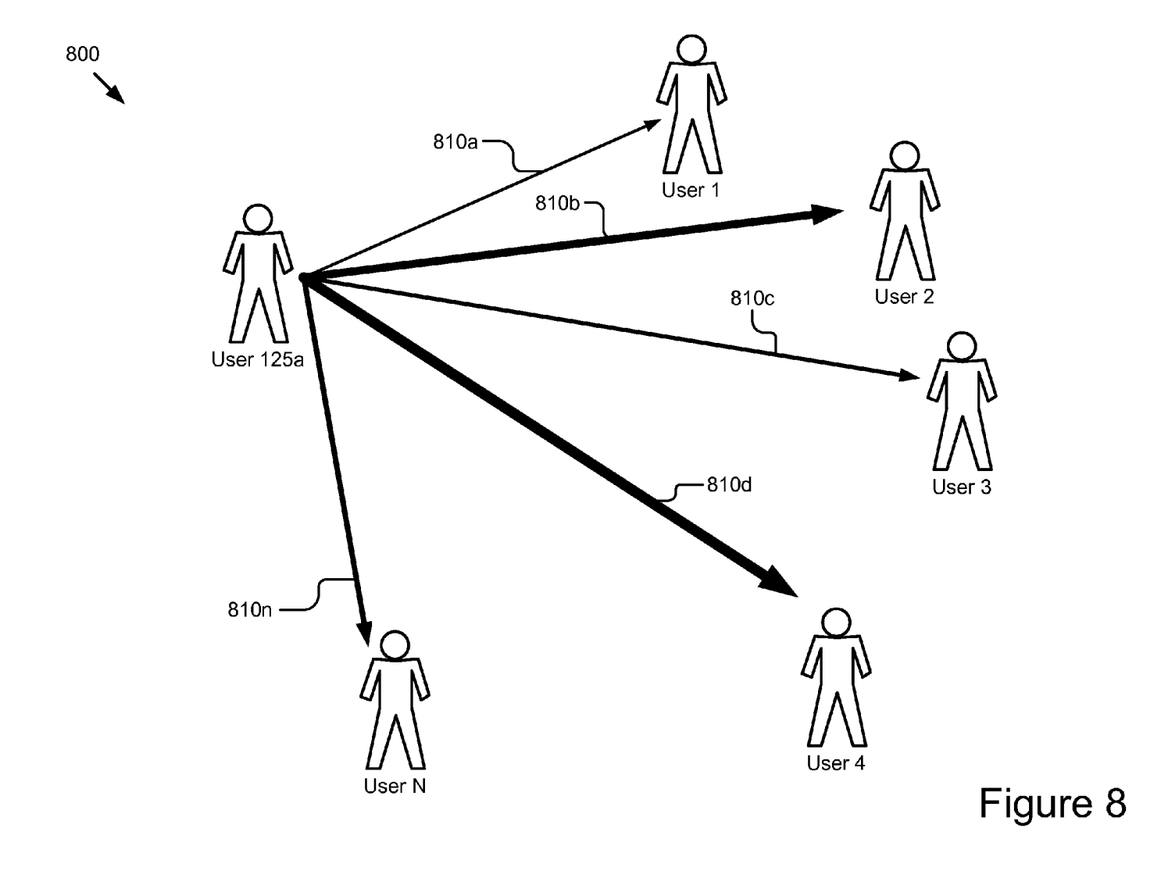
FIG. 8 is a graphic representation of an example social graph illustrating users' connections based on personal similarity.

FIG. 8 is a graphic representation 800 of an example of a social graph and users' connections based on personal similarity. The graphic representation 800 includes users 1 through N, and their corresponding similarity connections 810a through 810n. In this example, the thickness of each line 810 represents the personal similarity between the user 125a and each social profile from each user 1 through user N.

Figure 9:
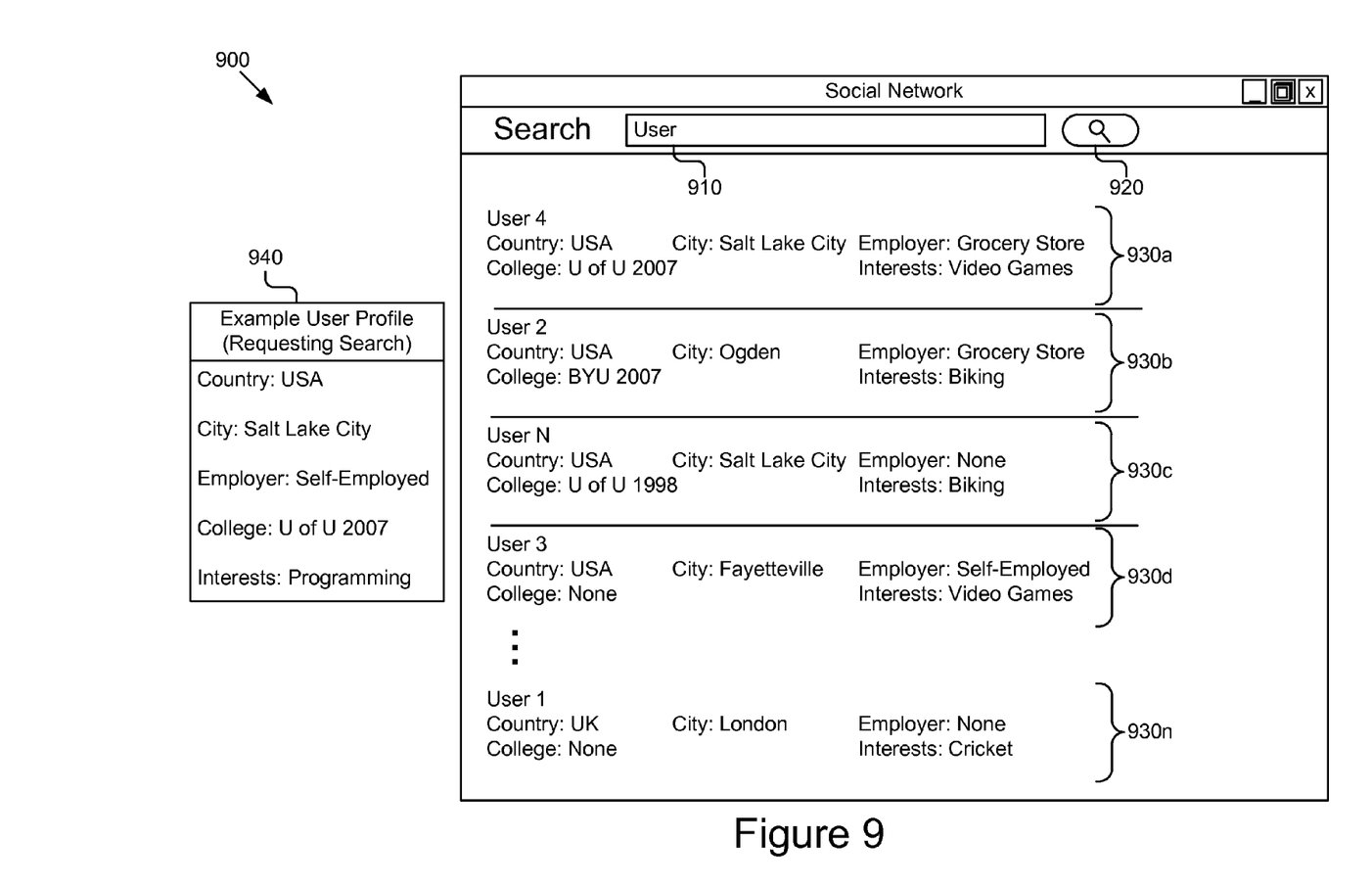
FIG. 9 is a graphic representation of an example user interface for displaying social profile search results in order of personal similarity ranking, also illustrating an example profile for the user requesting the search.

FIG. 9 is a graphic representation 900 of an example user interface for displaying social profile search results in order of personal similarity. The graphic representation 800 includes a search bar 910, a search button 920, user profile search results 930a through 930n, and example searching user profile information 940. In this example, the user 125a has searched for "User" and has returned a list of user profile search results 930a through 930n matching the query "User." In this example, the search results 930a through 930n include information about each user. This information includes a country, city, employer, college, and interests. User 4 shares more items from similarity with the searching user than the other users that matches the search query (both from Salt Lake City, USA and both attended the U of U at the same time) and therefore User 4 is at the top of the list.

In the preceding description, for purposes of explanation, numerous specific details are indicated in order to provide a thorough understanding of the technology described. This technology may be practiced without these specific details. In the instances illustrated, structures and devices are shown in block diagram form in order to avoid obscuring the technology. For example, the present technology is described with some implementations illustrated above with reference to user interfaces and particular hardware. However, the present technology applies to a computing device that can receive data and commands, and devices providing services. Moreover, the present technology is described above primarily in the context of ranking social profile search results based on a personal similarity score; however, the present technology applies to a situation and may be used for other applications beyond social profiles. In particular, this technology may be used in other contexts besides social profiles.

Reference in the specification to "one implementation," "an implementation," or "some implementations" means simply that one or more particular features, structures, or characteristics described in connection with the one or more implementations is included in at least one or more implementations that are described. The appearances of the phrase "in one implementation or instance" in various places in the specification are not necessarily referring to the same implementation or instance.

Some portions of the preceding detailed descriptions are presented in terms of algorithms and symbolic representations of operations on data bits within a computer memory of either one or more computing devices. These algorithmic descriptions and representations are the means used to most effectively convey the substance of the technology. An algorithm as indicated here, and generally, may be conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that these and similar terms are to be associated with the appropriate physical quantities and are merely convenient labels applied to these quantities. Unless specifically stated otherwise, as apparent from the preceding discussion, it should be appreciated that throughout the description, discussions utilizing terms, for example, "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. For example, a computer program may be stored in a computer-readable storage medium, for example, but not limited to, a disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or a type of media suitable for storing electronic instructions, each coupled to a computer system bus.

This technology may take the form of an entirely hardware implementation, an entirely software implementation, or an implementation including both hardware and software components. In some instances, this technology may be implemented in software, which includes but may be not limited to firmware, resident software, microcode, etc.

Furthermore, this technology may take the form of a computer program product accessible from a computer-usable or computer-readable medium providing program code for use by or in connection with a computer or an instruction execution system. For the purposes of this description, a computer-usable or computer-readable medium may be an apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code may be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to a particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to a particular programming language. It should be understood that a variety of programming languages may be used to implement the technology as described here.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. The present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, the modules, routines, features, attributes, methodologies and other aspects of the present technology can be implemented as software, hardware, firmware, or a combination of the three. Also, wherever a component, an example of which may be a module, of the present technology may be implemented as software, the component can be implemented as a standalone program, as part of a larger program, as a plurality of separate programs, as a statically or dynamically linked library, as a kernel loadable module, as a device driver, and/or in other ways. Additionally, the present technology is in no way limited to implementation in a specific programming language, or for a specific operating system or environment. Accordingly, the disclosure of the present technology is intended to be illustrative, but not limiting, of the scope of the present disclosure, which is set forth in the following claims.

What is claimed is:

1. A method, comprising:

receiving, by at least one computing device, a search query for a social profile from a user of an online community;

in response to receiving the search query, retrieving, by the computing device, a plurality of social profile results matching the search query and a search score for at least certain of the plurality of social profile results based on how closely a profile for the user making the search query match the plurality of social profile results;

determining, by the computing device, a plurality of personal similarity indications between the plurality of social profile results and the profile for the user making the search query, based on predetermined criteria for establishing personal similarity, at least one of the predetermined criteria considering a similar time frame during which a personal occurrence between the user making the search query and at least one user associated with one of the plurality of social profile results is shared;

assigning, by the computing device, a select one of a plurality of varying weights from a range of weights to each of the plurality of personal similarity indications identified for at least certain of the plurality of social profile results, based on a probability of the shared personal occurrence within the similar time frame and computing a personal similarity score for each of the social profile results based on an aggregation of the plurality of personal similarity indications and their associated weights;

computing, by the computing device, a total score based on the search score and the personal similarity score for the plurality of social profile results; and sorting, by the computing device, the plurality of social profile results based on their total scores.

2. The method of claim 1, further comprising:
providing for display, using the computing device, the plurality of social profile results, to the user making the search query.

3. The method of claim 1, wherein the range of weights includes weight indications of high weights, medium weights, and low weights, wherein high weights are accorded to personal similarity indications that reflect similar times.

4. The method of claim 1, wherein the plurality of social profile results are further sorted based on significance of the plurality of social profile results to the user indicating an affinity to the user.

5. The method of claim 4, wherein the significance indicates a descending order of the total score for the plurality of social profile results.

6. The method of claim 1, wherein the personality similarity indications include a past occurrence indication shared by the plurality of social profile results and the profile for the user.

7. The method of claim 1, further comprising:
assigning, using the computing device, an initial score of zero to the plurality of social profile results and subsequently increasing the initial score based on the plurality of weights assigned to the plurality of personal similarity indications to compute the personal similarity score and the total score.

8. A computer program product comprising a non-transient computer useable medium including a computer readable program, wherein the computer readable program when executed on a computer causes the computer to:
receive a search query for a social profile from a user on an online community;
in response to receiving the search query, retrieve a plurality of social profile results matching the search query and a search score for at least certain of the plurality of social profile results based on how closely a profile for the user making the search query match the plurality of social profile results;
determine a plurality of personal similarity indications between the plurality of social profile results and the profile for the user, based on predetermined criteria for establishing similarity, wherein at least one of the predetermined criteria considers a similar time frame during which a personal occurrence between the user making the search query and at least one user associated with one of the plurality of social profile results is shared;
assign a plurality of varying weights from a range of weights to each of the plurality of personal similarity indications identified for at least certain of the plurality of social profile results, based on a probability of the shared personal occurrence within the similar time frame and computing a personal similarity score for each of the social profile results based on an aggregation of the plurality of personal similarity indications and their associated weights;
compute a total score based on the search score and the personal similarity score for the plurality of social profile results; and
sort the plurality of social profile results based on the total score determined for each of the plurality of social profile results.

9. The computer program product of claim 8, wherein the plurality of social profile results are provided for display to the user making the search query.

10. The computer program product of claim 8, wherein the range of weights includes weight indications of high weights, medium weights, and low weights, wherein high weights are accorded to personal similarity indications that reflect similar times.

11. The computer program product of claim 8, wherein the plurality of social profile results are further sorted based on significance of the plurality of social profile results to the user indicating an affinity to the user.

12. The computer program product of claim 11, wherein the significance indicates a descending order of the total score for the plurality of social profile results.

13. The computer program product of claim 8, wherein the personality similarity indications include a past occurrence shared by the plurality of social profile results and the profile for the user.

14. The computer program product of claim 8, wherein an initial score of zero is assigned to the plurality of social profile results and subsequently the initial score is increased based on the plurality of weights assigned to the plurality of personal similarity indications to compute the personal similarity score and the total score.

15. A system comprising:
a processor, and;
a memory storing instructions that, when executed, cause the system to:
receive a search query for a social profile from a user on an online community;
in response to receiving the search query, retrieve a plurality of social profile results matching the search query and a search score for at least certain of the plurality of social profile results based on how closely a profile for the user making the search query match the plurality of social profile results;
determine a plurality of personal similarity indications between the plurality of social profile results and the profile for the user, based on predetermined criteria for establishing similarity, wherein at least one of the predetermined criteria considers a similar time frame during which a personal occurrence between the user making the search query and at least one user associated with one of the plurality of social profile results is shared;
assign a select one of a plurality of varying weights from a range of weights to each of the plurality of personal similarity indications identified for at least certain of the plurality of social profile results, based on a probability of the shared personal occurrence within the similar time frame and computing a personal similarity score for each of the social profile results based on an aggregation of the plurality of personal similarity indications and their associated weights;
compute a total score based on the search score and the personal similarity score for the plurality of social profile results; and
sort the plurality of social profile results based on the total score.

16. The system of claim 15, further comprising:
a user-interface module for providing for display the plurality of social profile results, to the user making the search query.

17. The system of claim 15, wherein the range of weights includes weight indications of high weights, medium weights, and low weights, wherein high weights are accorded to personal similarity indications that reflect similar times.

18. The system of claim 15, wherein the plurality of social profile results are further sorted based on significance of the plurality of social profile results to the user indicating an affinity to the user.

19. The system of claim 18, wherein the significance indicates a descending order of the total score for the plurality of social profile results.

20. The system of claim 15, wherein the personality similarity indications include a past occurrence shared by the plurality of social profile results and the profile for the user.

21. The system of claim 15, wherein the memory stores a further instruction that, when executed, cause the system to
   assign an initial score of zero to the plurality of social profile results and subsequently increase the initial score based on the plurality of weights assigned to the plurality of personal similarity indications to compute the personal similarity score and the total score.

* * * * *